No. 796,031. PATENTED AUG. 1, 1905.
T. DUNCAN.
ELECTRICAL MEASURING INSTRUMENT.
APPLICATION FILED JUNE 26, 1901. RENEWED AUG. 5, 1904.
2 SHEETS—SHEET 2.
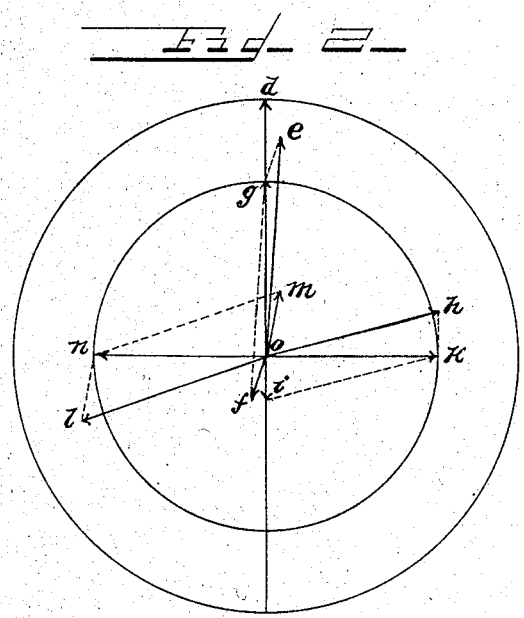
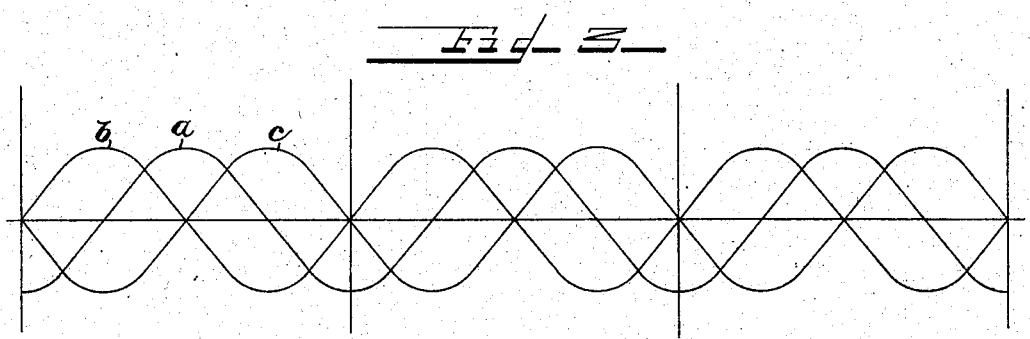
Witnesses
Max W. Zabel.
Chas. J. Schmidt.
Inventor
Thomas Duncan
By Charles A. Brown Cragg & Belfield
Attorneys

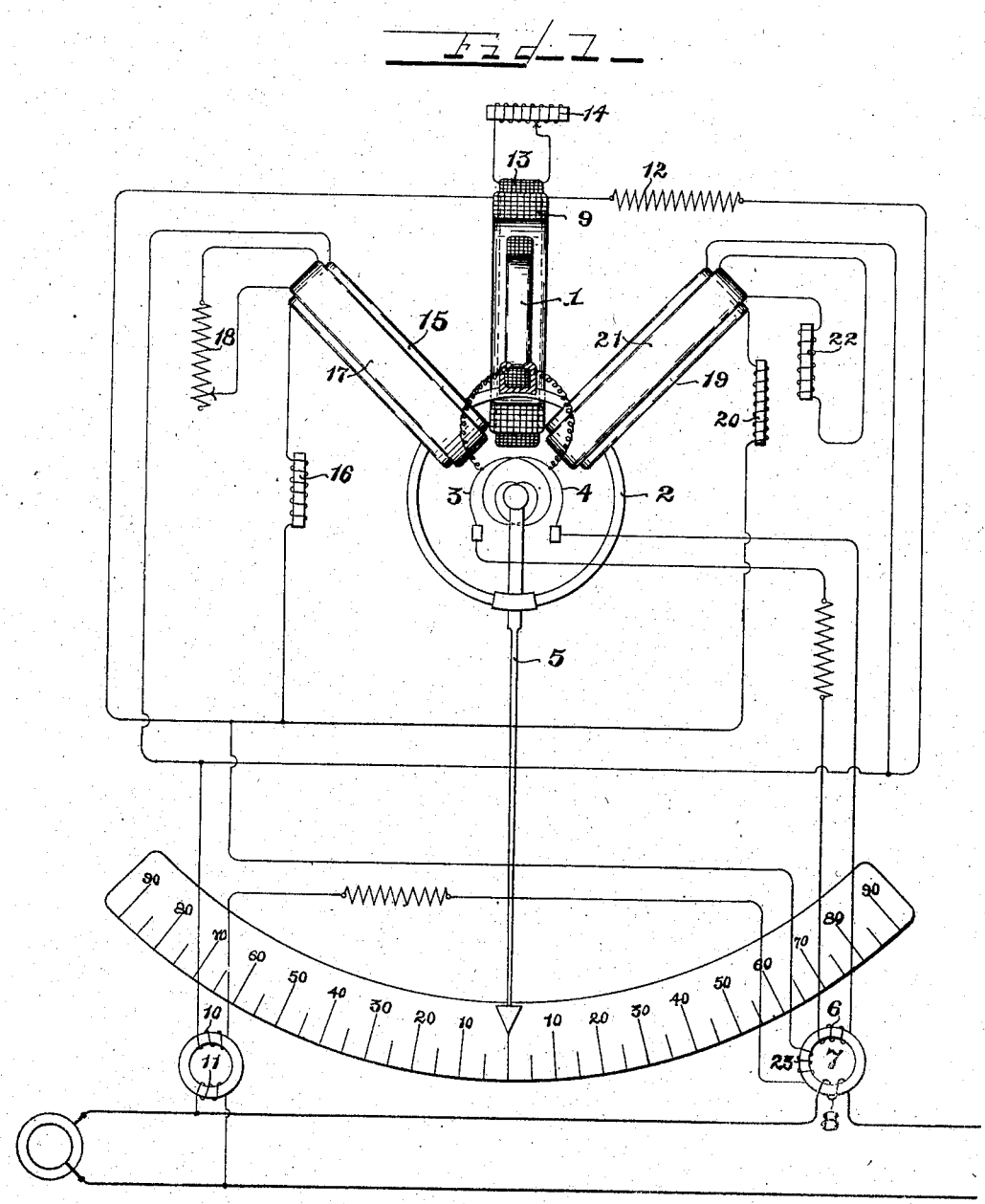

UNITED STATES PATENT OFFICE.

THOMAS DUNCAN, OF CHICAGO, ILLINOIS.

ELECTRICAL MEASURING INSTRUMENT.

No. 796,031.　　Specification of Letters Patent.　　Patented Aug. 1, 1905.

Application filed June 26, 1901. Renewed August 5, 1904. Serial No. 219,632.

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to means for indicating the phase difference between the current and pressure in alternating-current circuits, and has for its object the provision of means whereby such difference in phase may be determined by a single measuring element and whereby it may be determined whether the current leads or lags with respect to the pressure, although an instrument may be constructed embodying my invention that may indicate only phase difference or power factor without showing whether or not the current leads or lags. I accomplish this result by a means which are an improvement upon the means disclosed in my application, Serial No. 66,100, filed June 26, 1901. I provide a current field-winding producing magnetism that varies in phase with the current in the working or distribution circuit and associate with this current-winding three pressure-windings, one of which produces a field in phase with the pressure, the second of which produces a field ninety degrees in advance of the pressure, while the third pressure-winding produces a field ninety degrees behind the pressure. The pressure-winding that is in phase with the pressure is preferably disposed midway between the remaining pressure-windings at equal distances therefrom. When the current is in phase with the pressure, the intermediate pressure-winding and the current-winding preferably coincide in position. As the current lags or leads with respect to the pressure the current-winding is moved away from the intermediate pressure-winding toward one of the remaining windings to effect a movement of the needle, which is mounted to move with the current-winding, this winding being preferably the movable member of the meter. I have thus in the present invention added a third pressure-field that is in phase with the pressure, the additional pressure field-windings being provided to coöperate with the pressure field-winding producing a field in phase with the pressure to effect a movement of the current-winding in one direction or another to indicate phase difference. I have specified the pressure-windings as producing fields in phase with, ninety degrees behind, and ninety degrees in advance of the pressure. This is to be understood as being merely a relative arrangement, it only being necessary to have the meter so organized that when the current and pressure in the work or transmission circuit are in phase the field due to the current-winding will be in phase with the field due to one of the pressure-windings, while the fields due to the remaining two pressure-windings will be one in advance of and the other behind the field, due to the aforesaid pressure-winding, a quarter-period. The current-winding is so disposed upon its shaft that when the current and pressure in the working circuit are in phase the magnetic axes of the field due to the said winding and the field due to the intermediate pressure-winding coincide, the position of the current-winding being then unaffected by the fields due to the remaining pressure-windings. Upon change in phase between the current and the impressed pressure the field of the current-winding of the instrument will correspondingly vary in phase, whereby the current-winding is moved away from the intermediate pressure-winding and moved toward one or the other of the extreme pressure-windings.

Means are employed for maintaining the required ratio between the magnetizing effects of the current and pressure windings, so that the instrument will be responsive only to a change in the phase relations of the current and pressure and will not be operated upon a change in magnetizing effects that would otherwise arise when the current and pressure in the working or distribution circuit vary.

In applications, Serial Nos. 66,099 and 66,100, filed June 26, 1901, I have shown manually and automatically operated rheostats that regulate the resistance included in the current and pressure windings to maintain a constant magnetization of the fields thereof. In my present invention I employ induction means, preferably in the form of a transformer, that serves to maintain the required ratio. In the preferred embodiment of the invention the current-winding is included in circuit with the secondary, in which current is induced by a primary included in the main circuit. Another secondary coil is also in inductive relation with the said primary coil and is preferably included in series with a conductor common to and conveying current to all of the pressure-windings, whereby compensating electromotive force is introduced into the pressure-circuits to secure the required ratio between the fields of the current and pressure windings.

I will explain my invention more fully by reference to the accompanying drawings, in which—

Figure 1 illustrates a system of alternating-current distribution with an instrument of my invention associated therewith. Fig. 2 is a vector diagram, illustrating the phase relations between the pressure-fields of the meter. Fig. 3 is a diagram illustrating the phase relations between the pressure-fields of the meter.

Like parts are indicated by similar characters of reference throughout the figures.

The current-winding 1 is mounted in any convenient manner upon a ring 2 of aluminium or other suitable material. Two springs 3 and 4, wound in opposite directions, engage the shaft upon which the ring and needle 5 are mounted. The springs 3 and 4 may serve to conduct current from the secondary winding 6 of a transformer 7 to the current-winding 1. A primary coil 8 is included in series with a transmission-conductor and by its inductive action upon coil 6 produces a current in coil 1 that causes a magnetizing effect varying in phase with the current in the main circuit. A pressure field-winding 9 is connected in circuit with the secondary 10 of a transformer whose primary 11 is in bridge of the transmission-conductors, the field due to this pressure-winding and its accessories being in phase with the pressure. A non-inductive resistance 12 is in series with the winding 9 to decrease the lag.

On account of some self-induction due to the winding 9 I provide a compensating short-circuited coil 13, that includes in its circuit an inductive resistance 14, whereby a pressure-field is produced at the winding 9 that is in phase with the impressed pressure. The pressure-winding 15 is placed to the left of the winding 9 and is provided with means whereby its magnetism is caused to lag ninety degrees with respect to the impressed pressure. To accomplish this exact phase displacement, an impedance-coil 16 is included in series with the winding 15, while a short-circuited coil 17 in secondary relation to the coil 15 is provided, the coil 17 also including a non-inductive adjusting resistance 18. The pressure-winding 19 is located upon the right of the pressure-winding 9 and is caused by means of its accessories to produce a field that is ninety degrees in advance of the impressed pressure. For this purpose I include an impedance-coil 20 in circuit with the coil 19 and provide a short-circuited winding 21, that includes an impedance 22, the short-circuited winding being in secondary relation to the coil 19. The manner in which this adjustment of the phase of the pressure-fields is secured will be understood by reference to Figs. 2 and 3. In Fig. 3 the line $a$ indicates the field due to the winding 9, this field being in phase with the impressed electromotive force. The line $b$ indicates the field due to winding 15, while the line $c$ indicates the field due to the coil 19, these three fields $a$, $b$, and $c$ being ninety degrees apart, field $b$ lagging behind the impressed pressure, while field $c$ is in advance thereof. In Fig. 2 the line $o\,d$ indicates the impressed pressure, the line $o\,e$ indicates the current in the winding 9, the line $o\,f$ indicates the current in the secondary coil 13, while the line $o\,g$ indicates the magnetism that results from the currents $o\,e$ and $o\,f$, this magnetism being in phase with the impressed pressure $o\,d$. The line $o\,h$ indicates the current due to the winding 15, the line $o\,i$ indicates the current in the winding 17, while the line $o\,k$ indicates the magnetism resulting from the currents $o\,h$ and $o\,i$, which magnetism is in quadrature with the impressed pressure $o\,d$. The line $o\,l$ indicates the current in the winding 19, the line $o\,m$ indicates the current in the winding 21, while the line $o\,n$ indicates the magnetism due to the currents $o\,l$ and $o\,m$, which magnetism is also in quadrature with the impressed pressure $o\,d$ or displaced one hundred and eighty degrees with respect to the magnetism $o\,k$. It is to be understood that I do not limit myself to a construction wherein the pressure-windings are not included in the same circuit. By this arrangement of the pressure and current windings the windings 9, 15, and 19 produce fields that are in phase with, ninety degrees behind, and ninety degrees in advance of the impressed pressure, while the phase of the field due to the current-winding coincides with the current in the transmission-circuit. When the current in the working circuit and the coil 1 are in phase with the pressure, the magnetism of coil 1 will be in phase with the pressure and with the magnetism of coil 9, in consequence of which the field due to the winding 9 will attract the coil 1 to its central position, whereby the needle 5 is brought to a central position to indicate upon the reading-scale that the current and pressure in the working circuit are in phase. As the fields due to the pressure-windings 15 and 19 are then ninety degrees out of phase with respect to the field due to the current-winding 1, these fields will have no influence upon the said current-winding. Supposing, if it were possible, that the current in the system should lag ninety degrees behind the pressure, the winding 1 would then produce a field lagging ninety degrees behind the pressure, which field would be in phase with respect to the field due to winding 15, the field of winding 15 then attracting the current-winding 1, the pointer 5 thereupon swinging in a contra-clockwise direction to the scale-mark "90" upon the right of the scale, indicating a ninety-degree lag between the current and pressure. Supposing the current in the working circuit to be ninety degrees in advance of the pressure, if this were possible, then the winding 1 would produce a field ninety degrees in advance of the pressure and in phase with the field due to the winding 19, the latter field then attracting the winding 1 to swing the pointer in a clockwise direction to the scale-mark "90" upon the left of the scale to indicate that the current is ninety degrees in advance of the pressure.

My improved means for maintaining the required ratio between the magnetizing effects of the windings of the instrument consist in the preferred embodiment of the invention of a secondary winding 23 that is in inductive relation with the primary winding included in the transmission-circuit, preferably the winding 8, this winding 23 being included in series with the secondary winding 10. As the current in the mains increases so does also the current through the winding 1; but the coil 23 develops a counter or corrective electromotive force to that due to coil 10, whereby the current through the coils 9, 15, and 19 is reduced in proportion to the increase of current in the mains. As the current in the mains decreases a corresponding compensation is provided by the same means to maintain the required ratio between the magnetizing effects of the windings of the instrument.

It is obvious that many changes may be made from the device of my invention herein shown and particularly described, and I do not wish to be limited to the precise embodiments thereof herein set forth; but,

Having thus described my invention, I claim as new and desire to secure by Letters Patent—

1. The combination with an alternating-current system of distribution, of an instrument having three pressure-windings, two of the pressure-windings serving to produce fields differing in phase ninety degrees, while the third pressure-winding produces a field displaced from the field of one of the said pressure-windings one hundred and eighty degrees and from the other pressure-winding ninety degrees, a current-winding, and a measuring element operated upon a variation in phase between the field due to the current-winding and the fields of the pressure-windings, substantially as described.

2. The combination with an alternating-current system of distribution, of an instrument having three pressure-windings, two of the pressure-windings serving to produce fields differing in phase ninety degrees, while the third pressure-winding produces a field displaced from the field of one of the said pressure-windings one hundred and eighty degrees and from the other pressure-winding ninety degrees, a current-winding producing a field in phase with the field due to one of the said pressure-windings when the current and pressure in the working circuit are in phase, and at the same time differing ninety degrees from the fields due to the remaining pressure-windings, and a measuring element operated upon a variation in phase between the field due to the current-winding and the fields of the pressure-windings, substantially as described.

3. The combination with an alternating-current system of distribution, of an instrument having three pressure-windings two of the pressure-windings serving to produce fields differing in phase ninety degrees, while the third pressure-winding produces a field displaced from the field of one of the said pressure-windings one hundred and eighty degrees, and from the other pressure-winding ninety degrees, a current-winding, a measuring element operated upon a variation in phase between the field due to the current-winding and the fields of the pressure-windings, and means whereby the reactions between the fields due to the current and pressure windings are independent of the strength of current in the system, substantially as described.

4. The combination with an alternating-current system of distribution, of an instrument having three pressure-windings, two of the pressure-windings serving to produce fields differing in phase ninety degrees, while the third pressure-winding produces a field displaced from the field of one of the said pressure-windings one hundred and eighty degrees and from the other pressure-winding ninety degrees, a current-winding producing a field in phase with the field due to one of the said pressure-windings when the current and pressure in the working circuit are in phase, and at the same time differing ninety degrees from the fields due to the remaining pressure-windings, a measuring element operated upon a variation in phase between the field due to the current-winding and the fields of the pressure-windings, and means whereby the reactions between the fields due to the current and pressure windings are independent of the strength of current in the system, substantially as described.

5. The combination with an alternating-current system of distribution, of an instrument having three pressure-windings two of the pressure-windings serving to produce fields differing in phase ninety degrees, while the third pressure-winding produces a field displaced from the field of one of the said pressure-windings one hundred and eighty degrees, and from the other pressure-winding ninety degrees, a current-winding, a measuring element operated upon a variation in phase between the field due to the current-winding and the fields of the pressure-windings, and a transformer for causing reactions between the fields due to the current and pressure windings to be independent of the strength of current in the system, substantially as described.

6. The combination with an alternating-current system of distribution, of an instrument having three pressure-windings two of the pressure-windings serving to produce fields differing in phase ninety degrees, while the third pressure-winding produces a field displaced from the field of one of the said pressure-windings one hundred and eighty degrees and from the other pressure-winding ninety degrees, a current-winding, a measuring element operated upon a variation in phase between the field due to the current-winding and the fields of the pressure-windings, a transformer causing the reactions between the fields due to the current and pressure windings to be independent of the strength of current in the system, and a circuit in which the said transformer is adapted to create corrective electromotive force, substantially as described.

7. The combination with an alternating-current system of distribution, of a current-winding and a pressure-winding receiving current from the said system and producing fields coinciding in phase when the current and pressure in the system are coincident in phase, an indicating device actuated upon variation in phase between the fields produced by the said windings to indicate the phase displacement between the current and pressure in the system, and a transformer whereby mutually-reacting magnetic effects in the current and pressure windings are secured to eliminate the effects due to variation in the load conditions of the circuit, substantially as described.

8. The combination with an alternating-current system of distribution, of a current-winding and a pressure-winding receiving current from the said system and producing fields coinciding in phase when the current and pressure in the system are coincident in phase, an indicating device actuated upon variation in phase between the fields produced by the said windings to indicate the phase displacement between the current and pressure in the system, and a transformer whereby mutually-reacting magnetic effects in the current and pressure windings are secured to eliminate the effects due to variation in the load conditions of the circuit, said transformer serving to impress upon the instrument corrective electromotive force, substantially as described.

9. The combination with an alternating-current system of distribution, of a current-winding and a pressure-winding receiving current from the said sytem, an indicating device actuated upon variation in phase between the fields produced by the said windings to indicate the phase displacement between the current and pressure in the system, and a transformer whereby mutually-reacting magnetic effects in the current and pressure windings are secured to eliminate the effects due to variation in the load conditions of the circuit, substantially as described.

10. The combination with an alternating-current system of distribution, of a current-winding and a pressure-winding receiving current from the said system, an indicating device actuated upon variation in phase between the fields produced by the said windings to indicate the phase displacement between the current and pressure in the system, and a transformer, said transformer creating corrective electromotive force to eliminate the effects due to variation in the load conditions of the circuit, substantially as described.

11. The combination with an alternating-current system of distribution, of a current-winding and a pressure-winding receiving current from the said system, an indicating device actuated upon a variation in phase relation between the magnetic fields produced by the said windings to indicate the phase displacement between the current and pressure in the system, and a transformer controlled by the current in one winding for impressing corrective electromotive force upon the remaining winding, substantially as described.

In witness whereof I hereunto subscribe my name this 23d day of May, A. D. 1901.

THOMAS DUNCAN.

Witnesses:
GEORGE L. CRAGG,
HERBERT F. OBERGFELL.